United States Patent
Muenster et al.

(10) Patent No.: US 10,658,868 B2
(45) Date of Patent: May 19, 2020

(54) WAVEGUIDE HOUSING CHANNELS FOR WIRELESS COMMUNICATIONS

(71) Applicant: TEXAS INSTRUMENTS INCORPORATED, Dallas, TX (US)

(72) Inventors: Ralf J. Muenster, Saratoga, CA (US); Ali Djabbari, Saratoga, CA (US); Juan Alejandro Herbsommer, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 531 days.

(21) Appl. No.: 15/228,665

(22) Filed: Aug. 4, 2016

(65) Prior Publication Data

US 2018/0041070 A1    Feb. 8, 2018

(51) Int. Cl.
*H02J 13/00* (2006.01)
*G05B 15/02* (2006.01)
*H02J 7/00* (2006.01)
*H04W 4/80* (2018.01)

(52) U.S. Cl.
CPC .......... *H02J 13/0003* (2013.01); *G05B 15/02* (2013.01); *H02J 7/0031* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 2009/0143111 A1* | 6/2009 | Oglesbee | H04B 1/04 455/572 |
| 2013/0314182 A1* | 11/2013 | Takeda | H01P 3/16 333/24 R |
| 2015/0171658 A1* | 6/2015 | Manova-Elssibony | H04B 5/0006 320/108 |
| 2017/0115927 A1* | 4/2017 | Martin | G06F 3/0647 |
| 2017/0331159 A1* | 11/2017 | Keser | H01M 10/4257 |
| 2017/0351474 A1* | 12/2017 | Lagnado | G06F 3/14 |

* cited by examiner

*Primary Examiner* — Paul B Yanchus, III
(74) *Attorney, Agent, or Firm* — Brian D. Graham; Charles A. Brill; Frank D. Cimino

(57) ABSTRACT

An apparatus includes a housing for an electronic circuit. The housing includes at least three planes that form a structure to house the electronic circuit. At least one channel is formed along at least one of the three planes to provide a waveguide in the housing for wireless communications. A wireless communications module communicates via the waveguide to control the electronic circuit enclosed in the housing.

20 Claims, 4 Drawing Sheets

WAVEGUIDE HOUSING CHANNELS FOR WIRELESS COMMUNICATIONS

TECHNICAL FIELD

This disclosure relates to communications circuits and more particularly to a housing for electronic circuits that employs waveguide channels formed on the housing for wireless communications.

BACKGROUND

Various different types of electronic circuits are housed within enclosed packages such as metallic or plastic-form packaging. These circuits can be simpler in nature such as a power storage cell application to more elaborate applications such as cell phones or other devices. With respect to power storage applications as an example, complex lithium ion battery packs used in automotive or grid storage require elaborate sensing and protection. For example, individual packs need to be controlled such that they can be charged when necessary and disconnected from the respective charging source when adequate charging levels have been achieved. This requires additional wiring to provide such control to each cell. In multi-cell applications, such wiring can be expensive in terms of cost, installation, and maintenance. Thus, the additional wires needed to monitor each individual battery cell and provide safety shutoff features add weight and complexity to these systems. Since each battery pack sits on a different potential, expensive data isolation techniques need to be applied with traditional methods. Also, since the battery housings are metal and batteries are assembled as a three dimensional stack, traditional radio frequency communications cannot be employed. Alternative communication methods include ultrasonic data transmission but these have proven too slow for the 1-2 Mb/s of data that needs to be aggregated through a typical multi-cell battery pack system.

SUMMARY

This disclosure relates to a housing for electronic circuits that employs channels on the housing for wireless communications. In one example, an apparatus includes a housing for an electronic circuit. The housing includes at least three planes that form a structure to house the electronic circuit. At least one channel is formed along at least one of the three planes to provide a waveguide in the housing for wireless communications. A wireless communications module communicates via the waveguide to control the electronic circuit enclosed in the housing.

In another example, a system includes a first housing for a first electronic circuit. The first housing includes at least three planes that form a first structure to house the first electronic circuit. At least one channel is formed along at least one of the three planes of the first housing to provide a waveguide in the first housing for wireless communications. The system includes a second housing for a second electronic circuit. The second housing includes at least three planes that form a structure to house the second electronic circuit. At least one channel is formed along at least one of the three planes of the second housing to provide a waveguide in the second housing for wireless communications. The waveguide in the first housing is operatively coupled to the waveguide in the second housing to form a wireless communications network between the first and the second housing. The system includes a host system to send control commands to the first electronic circuit of the first housing and the second electronic circuit of the second housing over the wireless network formed between the first and second housing.

In yet another example, a method includes constructing a housing for an electronic circuit that includes at least three planes to house the electronic circuit. The method includes forming at least one channel along at least one of the three planes to provide a waveguide in the housing for wireless communications. The method includes coupling the electronic circuit in the housing to a wireless module that communicates to the waveguide.

DETAILED DESCRIPTION

This disclosure relates to a housing for electronic circuits that employs channels on the housing for wireless communications. Waveguide channels can be added to or formed within the housing for the electronic circuits to support wireless communications via the waveguide to a host system communicating with the electronic circuits. The electronic circuits can be substantially any type of circuit that utilizes remote control and communications with the host system and enclosed by the housing. These circuits can include power supplies, audio or video circuits, cell phones, and so forth. In one example application, the electronic circuits can include battery packs that are connected to a charging power source that is connected and disconnected from the charging source by control commands sent from the host system. Rather than connecting separate control wires to each of the battery packs as in conventional systems to execute the control commands, the integrated waveguide channels in the housing forms a wireless communications network to send and receive the commands which mitigates wiring and expense.

By way of example, if five hundred battery packs were ganged in a conventional system to provide a parallel power source, over one thousand control wires would have to be connected to the collection of battery packs to support charging, discharging, and/or other cycles such as safety event cycles. Such wiring adds significant expense and maintenance to a given installation of battery packs. The waveguide channels disclosed herein can be inexpensively fabricated as part of the housing that houses the battery packs (or other electronic circuits) to support wireless communications and control to each member of a given network formed by the waveguide channels. In some examples, rectangular waveguides can be added to an existing housing such as a rectangular appendage or circular tube. In other examples, the waveguide channels described herein can be formed as partial channels in each housing (e.g., along the various edges of the housing). Complete waveguides are then provided by combining a partial channel of one housing with one or more partial channels from another housing (or housings). By utilizing waveguide channels in the respective housings, wireless communications can be supported to control the electronic circuits housed within the housings while eliminating control circuit wiring of conventional systems. A wireless communications module in each housing can be provided to communicate with the respective waveguide channels and to send/receive the control commands with the host system to the respective electronic circuit (or circuits) within the housing.

Figure 1:
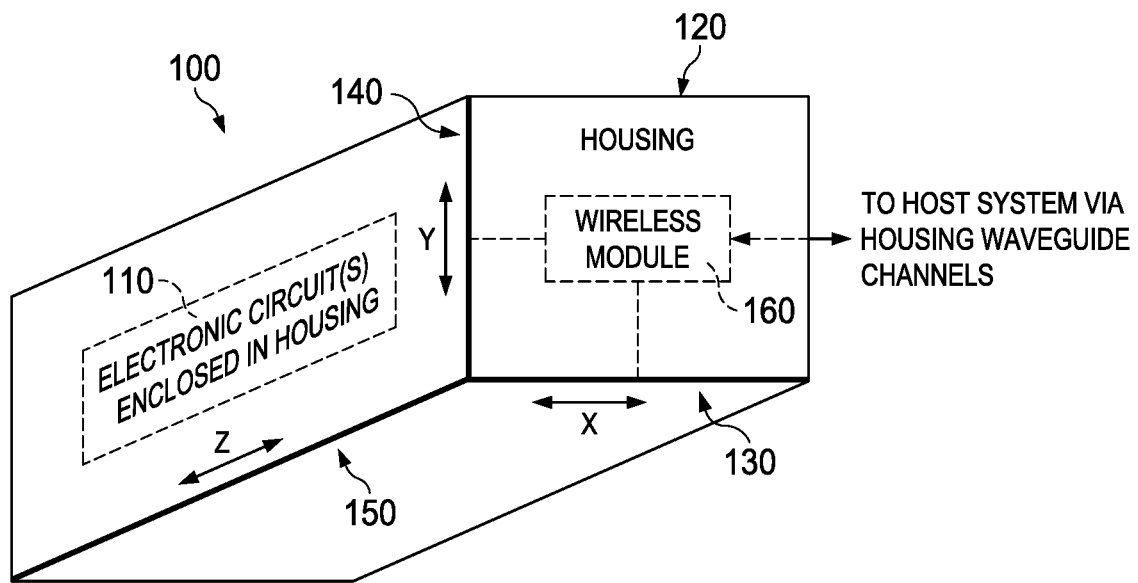
FIG. 1 illustrates a schematic block diagram of an example apparatus to provide wireless communications for an electronics circuit via a housing that includes waveguide channels for wireless communications.

FIG. 1 illustrates an example apparatus 100 to provide wireless communications for an electronics circuit 110 via a housing 120 that includes waveguide channels for wireless communications. As used herein, the term circuit can include a collection of active and/or passive elements that perform a circuit function such as an analog circuit or control circuit, for example. Additionally or alternatively, the term circuit can include an integrated circuit where all and/or some of the circuit elements are fabricated on a common substrate, for example.

The apparatus 100 includes the housing 120 which houses the electronic circuit 110 in the housing (partially or completely enclosed). The housing 120 can be metallic structure such as aluminum, steel, or copper, metalized plastic, or a combination thereof. The housing 120 includes at least three planes shown as an X plane, Y plane, and Z plane, that form a structure to house the electronic circuit 110. At least one channel 130, 140, and 150 shown at the junctions at the X, Y, and Z planes can be formed along at least one of the three planes to provide a waveguide in the housing 120 for wireless communications. As used herein, the term channel refers to a physical feature of the housing that forms a complete or partial waveguide. The physical feature can be a corrugation, groove, indentation, or other manufactured feature in or on the housing 120 that supports waveguide communications as described herein. As used herein, the term along can refer to a channel position/direction associated with the edge of a plane or housing or can refer to a channel position/direction associated with the inner portions of a given plane of the housing.

In some examples, the channel may be formed (or added) on a single plane. In other examples, the channels may be formed at the junction of two or more planes as shown via the channels 130, 140, and 150. In some examples, the channels may be formed as partial channels where the complete waveguide is formed by ganging multiple housings. In other examples, the channels can be added to the housing as a fully-formed waveguide. A wireless communications module 160 is provided to communicate via the waveguide provided by the respective channels to control the electronic circuit 110 housed in the housing. The wireless communications module 160 can include a radio frequency integrated circuit (millimeter wave chip) that drives communications to the respective waveguide formed by the channels described herein. The module 160 can support communications in a range of about 50 to about 500 Ghz, for example. As the frequencies are increased as supported by the wireless communications modules 160 described herein, the respective physical waveguide channel dimensions can be correspondingly decreased.

The electronic circuit 110 can be substantially any type of circuit that utilizes remote control and communications with a host system (See e.g., FIG. 2) and enclosed by the housing 120. These circuits can include power supplies, audio or video circuits, cell phones, and so forth. In one example application, the electronic circuits can include battery packs that are connected to a charging power source that is connected and disconnected from the charging source by control commands sent from the host system. Rather than connecting separate control wires to each of the battery packs as in conventional systems to execute the control commands, the integrated waveguide channels 130, 140, and 150 in the housing 120 forms a wireless communications network to send and receive the commands which mitigates wiring and expense.

In one example, the electronic circuit 110 can include a battery pack that is enclosed in the housing 120. The battery pack can include one or more cells of lithium-ion, for example, to store and provide charge from the pack. The wireless communications module 160 can send a control command (commands) to connect or disconnect the battery pack (e.g., via controllable switches) from a charging power source. For example, if a respective battery pack is determined to be fully charged, the host system can send a command over the waveguide channels to disconnect the battery packs from the charging source. If a given battery pack is determined to be low (e.g., via a status signal sent by the wireless module over the waveguide), the host system can send a charging command to connect the respective battery pack to the charging source. Other types of control commands can be event related such as power surge conditions where all battery packs are temporarily disconnected from the charging source during the surge.

The channel 130, 140, and 150 can be formed having an X dimension and a Y dimension that is corrugated into at least two of the three planes. As noted previously, in some examples, complete rectangular waveguides can be fabricated into the housing and in other examples, the channels 130, 140, and 150 form partial portions of the rectangular waveguides where ganging of multiple housings form the complete waveguide. Example waveguide wavelengths can include millimeter waves (mmWaves) that operate from about 40 to about 200 Gigahertz. The rectangular waveguide channels 130, 140, 150 can be specified having an X and Y dimension to support such mmWave communications. For example, the X dimension can be about 0.148 inches to about 0.02 inches and the Y dimension can be about 0.074 inches to about 0.01 inches that provides a frequency range of about 50 to about 500 Giga Hertz for the waveguide.

As noted above, the channel 130, 140, and 150 can be a partial channel that forms a rectangular waveguide with at least one other housing. In another example, the channel 130, 140, 150 can be a rectangular appendage or a circular tube that is fastened to the housing to form the waveguide. In yet another example, the channel can be formed along a first waveguide portion of a given plane and coupled via a wire to another waveguide portion of the given plane. Various channel configurations are illustrated and described below with respect to FIGS. 3 through 6.

Figure 2:
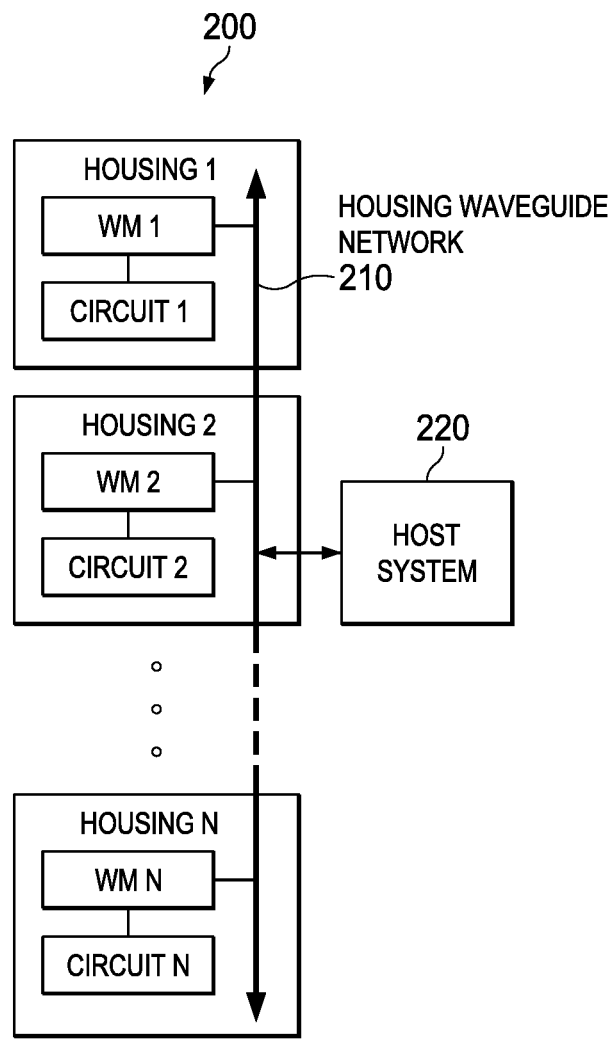
FIG. 2 illustrates a schematic block diagram of an example system to provide wireless communications between housings that includes waveguide channels for wireless communications.

FIG. 2 illustrates an example of a system 100 to provide wireless communications between housings that includes waveguide channels for wireless communications. The system 200 includes housings 1 though N where N is a positive integer. Each of the housings 1-N include a respecting wireless module shown as WM 1 though WM N and electronic circuits shown as circuit 1 through circuit N. The wireless modules 1-N control the associated electronic circuits and communicate with a waveguide network 210 formed by ganging one or more of the housings. For example, in a two housing ganging, a first housing 1 for the first electronic circuit 1 includes at least three planes that form a first structure to house the first electronic circuit 1. At least one channel is formed along at least one of the three planes of the first housing 1 to provide a waveguide in the first housing for wireless communications. A second housing 2 for the second electronic circuit 2 includes at least three planes that form a structure to house the second electronic circuit 2. At least one channel is formed in at least one of the three planes of the second housing 2 to provide a waveguide in the second housing for wireless communications. The waveguide in the first housing is operatively coupled to the waveguide in the second housing to form the wireless communications network 210 between the first and the second housing. More elaborate waveguide networks 210 can be provided by ganging N such housings (See e.g., FIGS. 7 and 8).

A host system 220 sends control commands to housings such as the first electronic circuit 1 of the first housing 1 and the second electronic circuit 2 of the second housing 2 over the wireless network 210 formed between the first and second housing. Each of the first and second electronic circuits 1 and 2 can include a battery pack (or other electronic application) that is housed in each of the first and second housing. The first and second wireless communications module 1 and 2 (or more if N housings are ganged) can be coupled to each of the first and the second electronic circuits 1 and 2 respectively, to send a control command to connect or disconnect the respective battery pack from a charging power source, for example. The first and second wireless communications modules 1 and 2 can receive the control command from the host system 220 that communicates via the waveguide network 210. At least one of the channels in each of the housings 1-N can be a partial channel that forms a rectangular waveguide between the housings. The channels in the respective housings can be a rectangular appendage or a circular tube that is fastened to the housing to form the waveguide network 210. In some cases, the channels may be formed in one portion of a plane and coupled to another portion of the plane as will be illustrated and described below with respect to FIGS. 3 though 6.

Figure 3:
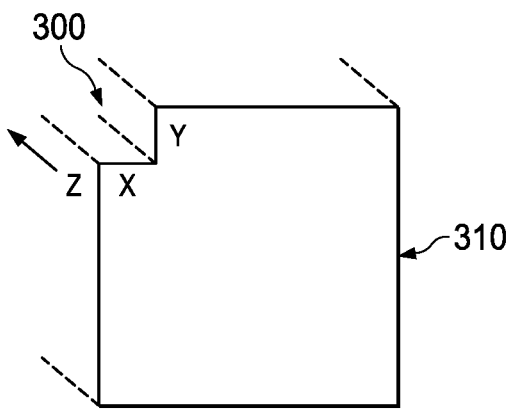
FIGS. 3 though 6 illustrate example channels that can be formed in a housing for wireless communications.

FIGS. 3 though 6 illustrate example channels that can be formed in a housing for wireless communications. With respect to FIG. 3, a partial channel is formed as a corrugation 300 in an example housing 310. The corrugation 300 includes a recess (e.g., metal folded in at the housing edges to form the recess) in both the X and Y planes of the housing 310 where the recess extends three dimensionally along the Z axis of the housing 310. Although a single corrugation 300 is shown for this example, each intersection of planes (e.g., X/Z, Y/Z) can have a corrugation where completed waveguides are constructed when ganging multiple housings such as shown in the examples of FIGS. 7 and 8.

Figure 4:
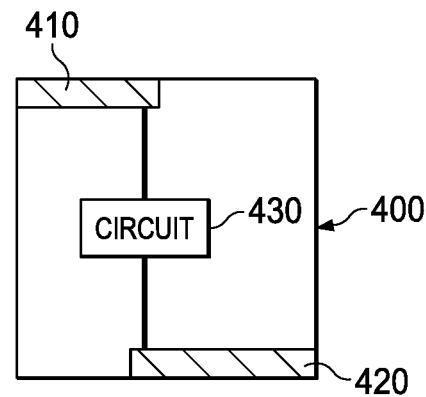

FIG. 4 illustrates a side view of a housing 400 where a waveguide channel portion is formed along one edge of a given plane at 410 and continued along another edge at 420. An interconnection circuit 430 connects the channel portion 410 with the channel portion 420. Such partial channel formation and connections as illustrated in FIG. 4 may be provided in some applications that require network configurations or housing mating configurations that are different from common block configurations such as illustrated in FIGS. 7 and 8.

Figure 5:
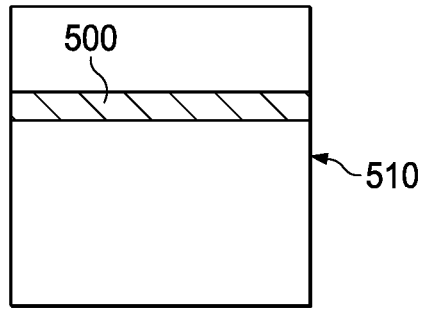
Figure 6:
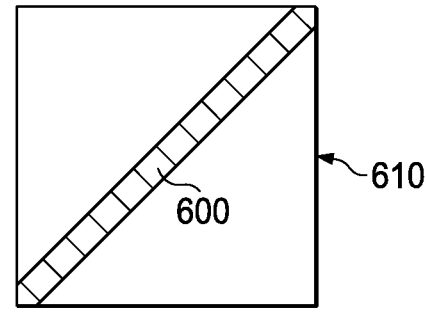

FIG. 5 illustrates a side view of an alternative channel 500 that can be provided as part of a housing 510. In this example, the channel runs along a middle portion of the housing 510 in contrast to the edge example depicted in FIG. 3. In yet another example, FIG. 6 illustrates a side view of a diagonal routing channel 600 for a housing 610. Other channel configurations are possible than shown in the examples of FIGS. 3 though 6.

Figure 7:
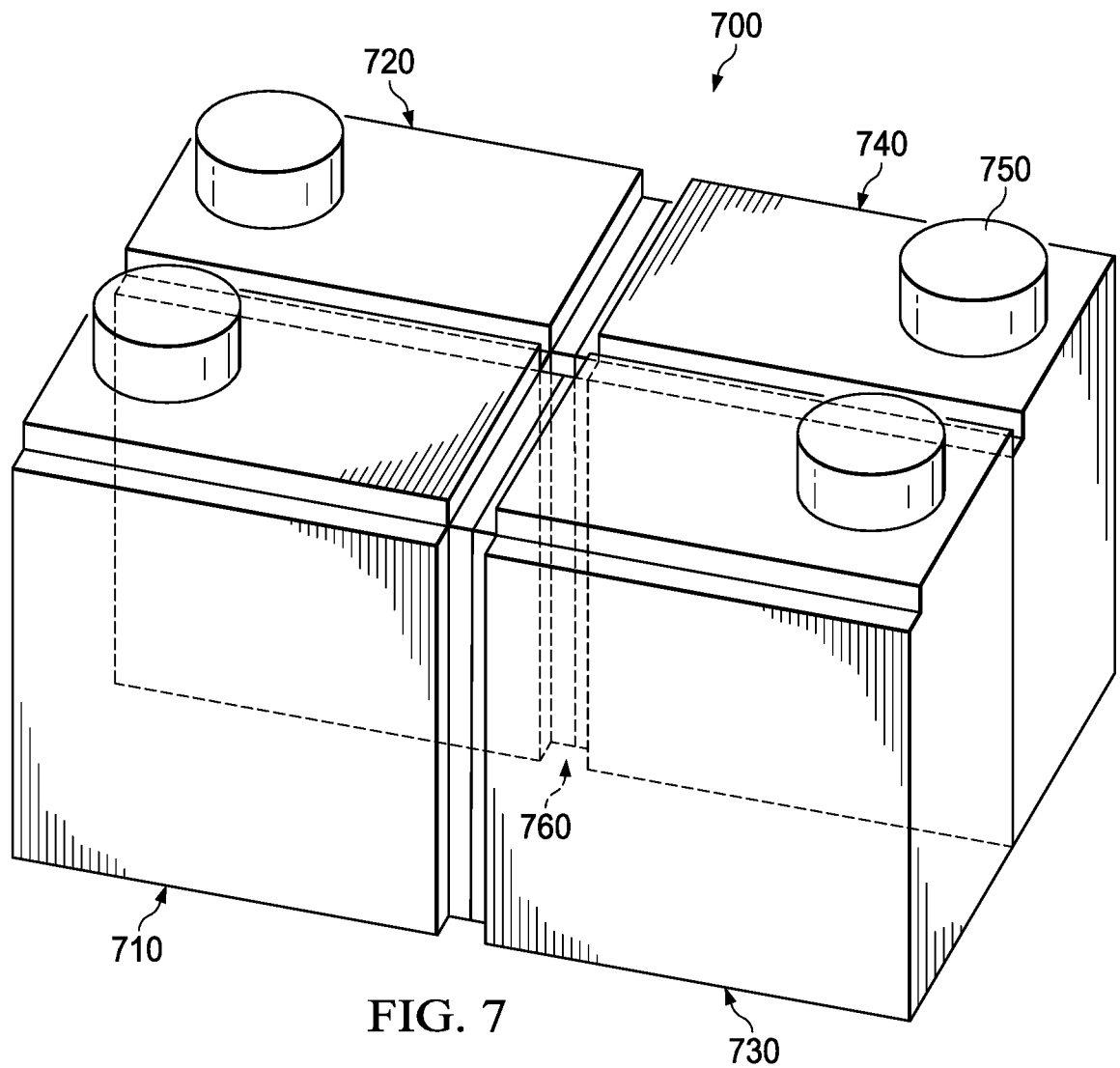
FIGS. 7 and 8 illustrate example configurations of ganged housings that can communicate across waveguides formed in the respective housings.
Figure 8:
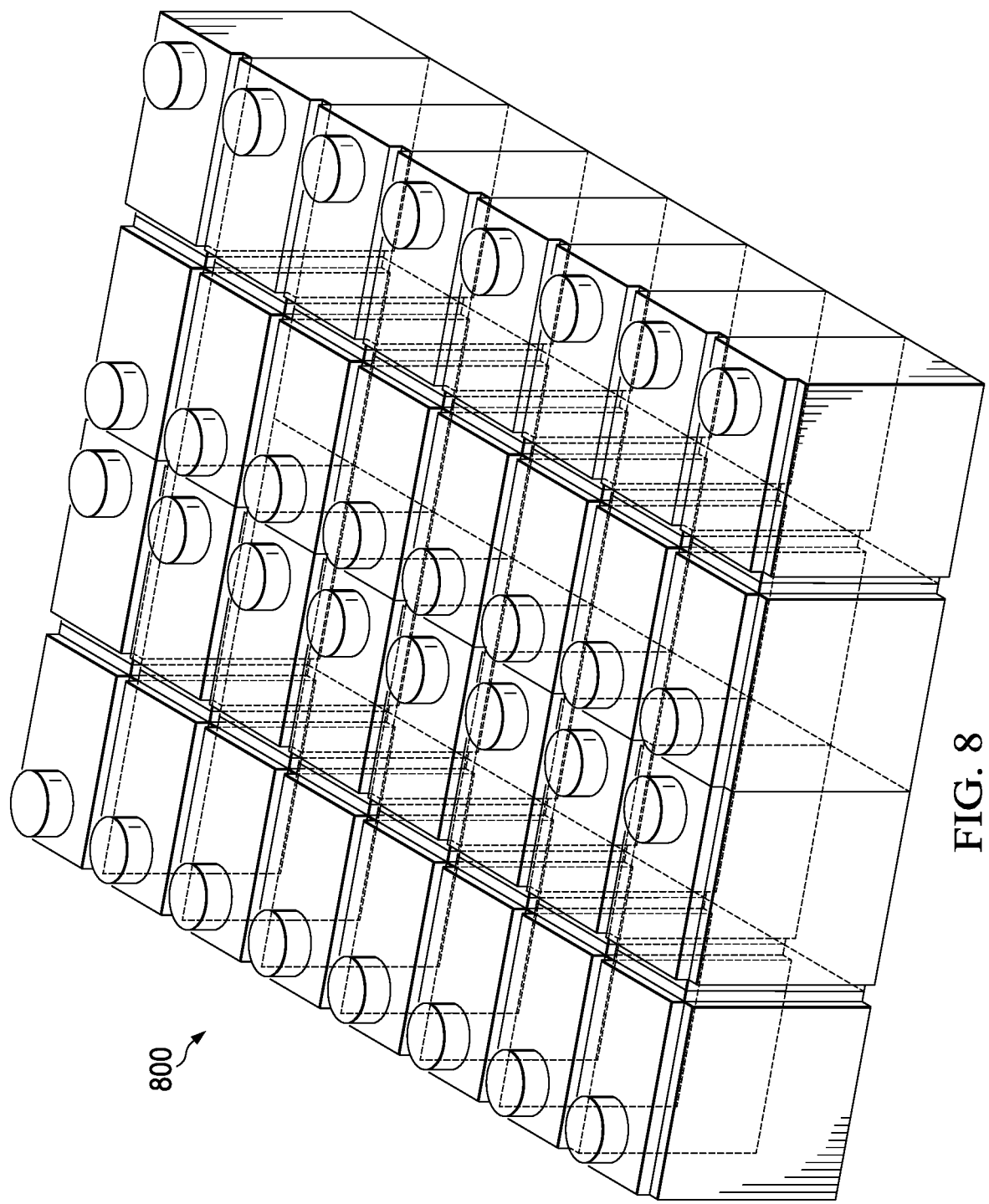

FIGS. 7 and 8 illustrate example configurations of ganged housings that can communicate across waveguides formed in the respective housings. With respect to FIG. 7, a four housing gang is illustrated at 700. The housings include a housing 710 though 740 which are ganged in a block configuration. At the top of each housing is a wireless communications module such as shown at 750 to communicate with the electronic circuits and host systems described herein and the waveguide network channels which are formed by the respective housing gangs. In this example, a complete waveguide network channel 760 is formed at the junction of the four housings 710-740. For instance, utilizing the partial corrugations such as shown at 300 of FIG. 3, a complete waveguide channel can be formed from the housing junctions at 760. Other ganging configurations are possible that includes N such housings. The example 800 of FIG. 8 shows 32 ganged housings which form a wireless network from waveguide channels configured by ganging partial channels from each of the respective housings.

Figure 9:
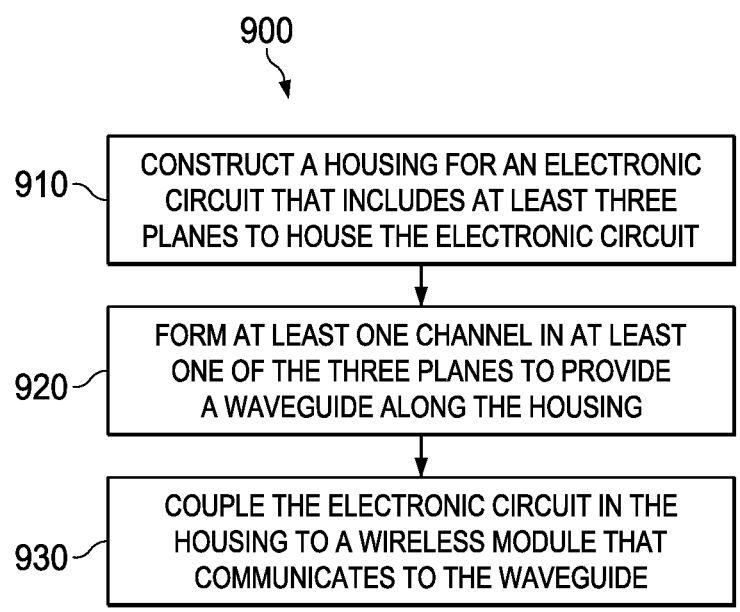
FIG. 9 illustrates a flow diagram of an example method to provide wireless communications for an electronics circuit via a housing that includes waveguide channels for wireless communications.

In view of the foregoing structural and functional features described above, an example method will be better appreciated with reference to FIG. 9. While, for purposes of simplicity of explanation, the method is shown and described as executing serially, it is to be understood and appreciated that the method is not limited by the illustrated order, as parts of the method could occur in different orders and/or concurrently from that shown and described herein. Such methods can be executed by various components configured in an integrated circuit, processor, or a controller, for example.

FIG. 9 illustrates an example method 900 to provide wireless communications for an electronics circuit via a housing that includes waveguide channels for wireless communications. At 910, the method 900 includes constructing a housing for an electronic circuit that includes at least three planes to house the electronic circuit. As noted previously, this can include forming metallic housings or metalized plastic housings that can support waveguide communications as described herein. At 920, the method 900 includes forming at least one channel along at least one of the three planes to provide a waveguide in the housing for wireless communications. This can include forming corrugations at the edge of each plane of the housing such as shown at FIG. 3, for example. At 930, the method 900 includes coupling the electronic circuit in the housing to a wireless module that communicates to the waveguide.

The electronic circuit can include a battery pack (or other type circuit) that is enclosed in the housing, for example. The method 900 can include sending a control command to connect or disconnect the battery pack from a charging power source, for example. This can include receiving the control command from a host system that communicates via the waveguide.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. Additionally, where the disclosure or claims recite "a," "an," "a first," or "another" element, or the equivalent thereof, it should be interpreted to include one or more than one such element, neither requiring nor excluding two or more such elements.

What is claimed is:

1. An apparatus, comprising:
a housing for housing a battery pack, the housing comprising:
a first wall;
a second wall adjacent to the first wall, the second wall orthogonal to the first wall; and
a third wall adjacent to the first wall and the second wall, the third wall orthogonal to the first wall and the second wall;
a channel along at least a portion of the first wall of the housing, forming a waveguide, the waveguide coupled to the battery pack, wherein the channel is formed along a first waveguide portion of the first wall and coupled via a circuit to another waveguide portion of the first wall; and
a wireless communications module coupled to the waveguide, the wireless communication module configured to instruct the battery pack to connect to or disconnect from a charging power source, by transmitting a command over the waveguide.

2. The apparatus of claim 1, wherein the wireless communications module receives a control command from a host system via the waveguide.

3. The apparatus of claim 2, wherein the channel is formed having an X dimension and a Y dimension that is corrugated along the first wall and the second wall.

4. The apparatus of claim 3, wherein the X dimension is about 0.148 inches to about 0.02 inches and the Y dimension is about 0.074 inches to about 0.01 inches.

5. The apparatus of claim 1, wherein the channel is a partial channel that forms a rectangular waveguide with at least one other housing.

6. The apparatus of claim 1, wherein the wireless communications module communicates with the battery pack over a frequency of between 50 GHz and 500 GHz.

7. The apparatus of claim 1, wherein the wireless communications module is configured to:
instruct the battery pack to disconnect from the charging power source in response to determining that the battery pack is fully charged; and
instruct the battery pack to connect to the charging power source in response to determining that the battery pack is low on charge.

8. A system, comprising:
a first housing for a first electronic circuit, the first housing comprising:
a first wall; and
a second wall adjacent to the first wall, the second wall of the first housing orthogonal to the first wall of the housing;
a second housing for a second electronic circuit, the second housing comprising:
a first wall; and
a second wall adjacent to the first wall, the second wall of the second housing orthogonal to the first wall of the second housing;
a third housing for a third electronic circuit, the third housing comprising:
a first wall; and
a second wall adjacent to the first wall, the second wall of the third housing orthogonal to the first wall of the third housing;
a waveguide at a junction of the first housing, the second housing, and the third housing; and
a host system to send control commands to the first electronic circuit of the first housing, to the second electronic circuit of the second housing, and to the third electronic circuit of the third housing over the waveguide.

9. The system of claim 8, wherein the first electronic circuit comprises a first battery pack enclosed in the first housing, and the second electronic circuit comprises a second battery pack enclosed in the second housing.

10. The system of claim 9, further comprising a first wireless communications module coupled to the first electronic circuit and a second wireless communications module coupled to send the second electronic circuit, the first wireless communications module to send a first control command to connect or disconnect the first battery pack from a charging power source, and the second wireless communications module to send a second command to connect or disconnect the second battery pack from the charging power source.

11. The system of claim 10, wherein the first wireless communications module receives the first control command from the host system via the waveguide and the second wireless communications module receives the first control command from the host system via the waveguide.

12. The system of claim 8, wherein waveguide is a partial channel that forms a rectangular waveguide between the first housing, the second housing, and the third housing.

13. The system of claim 8, further comprising a fourth housing for a fourth electronic circuit, the fourth housing comprising:
a first wall; and
a second wall adjacent to the first wall, the second wall of the fourth housing orthogonal to the first wall of the fourth housing;
wherein the waveguide is at the junction of the first housing, the second housing, the third housing, and the fourth housing.

14. The system of claim 13, wherein the waveguide is between an intersection of the first wall of the first housing and the second wall of the first housing, an intersection of the first wall of the second housing and the second wall of the second housing, an intersection of the first wall of the third housing and the second wall of the third housing, and an intersection of the first wall of the fourth housing and the second wall of the fourth housing.

15. A device comprising:
a housing for a circuit, wherein the housing includes:
a top surface;
a side surface;
a first surface extending from the side surface in a direction substantially parallel to the top surface;
a second surface extending from the first surface to the top surface in a direction substantially parallel to the side surface such that a channel is formed that is defined by the first surface and the second surface, wherein the housing is a first housing and is configured to couple to a second housing such that, when coupled, a third surface of the second housing extends in a direction substantially parallel to the second surface and further defines the channel; and
a wireless communication module communicatively coupled to the channel.

16. The device of claim 15, wherein:
the third surface of the second housing is a side surface; and
when coupled, the side surface of the first housing is configured to physically contact the side surface of the second housing.

17. The device of claim 15, wherein:
the second housing further includes:
- a top surface that extends from the third surface;
- a fourth surface that extends from the third surface in a direction substantially parallel to the top surface of the second housing; and
- a side surface that extends from the fourth surface in a direction substantially parallel to the third surface; and the first housing is configured such that, when coupled, the fourth surface of the second housing is substantially coplanar with the first surface of the first housing and further defines the channel.

18. The device of claim 15, wherein:
the side surface is a first side surface;
the housing further includes:
- a second side surface that extends substantially perpendicular to the first side surface;
- a fourth surface that extends from the second side surface in the direction substantially parallel to the top surface; and
- a fifth surface that extends from the fourth surface to the top surface in a direction substantially parallel to the second side surface; and the channel is further defined by the fourth surface and the fifth surface.

19. The device of claim 15 further comprising a battery pack disposed within the housing, wherein the wireless communications module is configured to instruct the battery pack to connect to a charging power source by transmitting a command via the channel.

20. The device of claim 19, wherein the wireless communications module is configured to:
determine a power level for the battery pack; and
transmit the command to instruct the battery to connect the charging power source based on the power level for the battery pack.

* * * * *